(12) United States Patent
Jaffari et al.

(10) Patent No.: US 9,747,038 B2
(45) Date of Patent: Aug. 29, 2017

(54) SYSTEMS AND METHODS FOR A HYBRID PARALLEL-SERIAL MEMORY ACCESS

(71) Applicant: QUALCOMM INCORPORATED, San Diego, CA (US)

(72) Inventors: Javid Jaffari, San Diego, CA (US); Amin Ansari, San Diego, CA (US); Rodolfo Beraha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 14/956,728

(22) Filed: Dec. 2, 2015

(65) Prior Publication Data
US 2017/0160928 A1   Jun. 8, 2017

(51) Int. Cl.
*G06F 3/06* (2006.01)

(52) U.S. Cl.
CPC .......... *G06F 3/061* (2013.01); *G06F 3/0635* (2013.01); *G06F 3/0658* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 5,121,502 A * | 6/1992 | Rau | G06F 9/3013 712/24 |
| 7,191,262 B2 | 3/2007 | Sleeman | |
| 8,510,487 B2 | 8/2013 | Ruberg et al. | |
| 8,583,869 B2 | 11/2013 | Hinkle et al. | |
| 8,904,104 B2 | 12/2014 | Cho | |
| 2004/0085996 A1 * | 5/2004 | Sleeman | G06F 13/385 370/465 |
| 2008/0126716 A1 | 5/2008 | Daniels | |
| 2010/0293325 A1 | 11/2010 | Maheshwari | |
| 2015/0317277 A1 | 11/2015 | Wang et al. | |

OTHER PUBLICATIONS

Hao Wang et al, "Alloy: Parallel-Serial Memory Channel Architecture for Single-Chip Heterogeneous Processor Systems," IEEE 21st International Symposium on High Performance Computer Architecture (HPCA); Feb. 7-11, 2015; pp. 296-308.
International Search Report and Written Opinion—PCT/US2016/059961—ISA/EPO—Feb. 8, 2017.

* cited by examiner

*Primary Examiner* — Kevin Verbrugge
(74) *Attorney, Agent, or Firm* — Smith Tempel Blaha LLC (57) ABSTRACT

Systems and methods are disclosed for a hybrid parallel-serial memory access by a system on chip (SoC). The SoC is electrically coupled to the memory by both a parallel access channel and a separate serial access channel. A request for access to the memory is received. In response to receiving the request to access the memory, a type of memory access is identified. A determination is then made whether to access the memory with the serial access channel. In response to the determination to access the memory with the serial access channel, a first portion of the memory is accessed with the parallel access channel, and a second portion of the memory is accessed with the serial access channel.

20 Claims, 6 Drawing Sheets

SYSTEMS AND METHODS FOR A HYBRID PARALLEL-SERIAL MEMORY ACCESS

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.).

System memory in such portable computing devices typically comprises various types of memory, such as dynamic random access memory (DRAM), electrically coupled to the SoC via a memory bus. Additionally, increasing demands for more and larger amounts of data needed by the SoC to support the expanding features and services has resulted in larger bandwidth parallel memory access channels. However, the increased need for more and larger parallel memory access channels results in an ever greater percentage of the limited number of pins on the SoC being dedicated to memory access, to the detriment of other features and capabilities of the SoC, and at a greater cost to manufacture the SoC.

Accordingly, there is a need for improved bandwidth in the memory access channels without the increase cost and number of pins required to increase bandwidth through parallel memory access channels in these and other portable computing devices.

SUMMARY OF THE DISCLOSURE

Systems, methods, and computer programs are disclosed for a hybrid parallel-serial memory access by a system on chip (SoC). One such method involves an SoC electrically coupled to the memory by both a parallel access channel and a separate serial access channel. A request for access to the memory is received. In response to receiving the request to access the memory, a type of memory access is identified. A determination is then made whether to access the memory with the serial access channel. In response to the determination to access the memory with the serial access channel, a first portion of the memory is accessed with the parallel access channel, and a second portion of the memory is accessed with the serial access channel.

Another embodiment is a system comprising a system on chip (SoC) electrically coupled to a memory by a parallel access channel and a separate serial access channel. The SoC comprises a memory controller configured to: receive a request to access the memory, in response to receiving the request to access the memory, identify a type of memory access, determine whether to access the memory with the serial access channel, and in response to determining to access the memory with the serial access channel, accessing a first portion of the memory with the parallel access channel, and accessing a second portion of the memory with the serial access channel.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Memory accesses in communication devices, including portable computing devices (PCDs), and especially memory accesses by a system on a chip (SoC) and a memory located external to the SoC ("off chip") are typically performed by parallel access channels. Data is transferred between a processor (or another component of the PCD) and a memory device with multiple bits sent simultaneously over the parallel access channels (wires, frequency channels) within the same cable, or radio path, and synchronized to a clock. A variety of standards, protocols, or technologies may be used to perform the parallel transfer of the data, such as transfers to (or from) a double data rate synchronous dynamic random-access memory (DDR SDRAM) using the DDR4-2400 DDR4 standard (DDR4). As known in the art parallel access channels, such as DDR4 for instance, provide various desirable characteristics including significantly lower latency, at the cost of increased I/O pin count required for the operation of the various channels, increased cost to manufacture from the multiple parallel wires required for the parallel access channel, and increased complexity in maintaining signal integrity and power integrity over the parallel channels (especially as the number of parallel channels increases and/or the distance between the processor and the memory device.

As more memory access bandwidth is needed for the PCDs, the typical approach has been to add more parallel channels to allow the transfer of ever-increasing amounts of data over the additional parallel channels. In other words, typical approaches increase the number of channels available to communication between a processor (or SoC) and one or more memories of the PCD. However, adding more parallel channels further increases the number of I/O pin count required to support the operation of the additional channels, further increases the complexity in maintaining signal integrity and power integrity for the parallel channels and increases the cost of the board and the chip package.

It is known that serial access channels may be used to communicate data between a processor (or SoC) and one or more PCD memories instead of parallel access channels. Such serial access channels may comprise a direct memory access channel, such as, for example, a peripheral component interconnection express (PCIe) channel. As known in the art, a PCIe channel provides various desirable characteristics, such as, higher maximum system bus throughput, lower I/O pin count, less complexity in maintaining signal integrity, and smaller physical footprint. However, PCIe is typically not used for system memory access because of the significantly greater latency or time required to transfer a given block of data between the processor (or SoC) and the memory over the single channel. This latency of serial access channels, such as PCIe, can be one thousand times greater than the latency of parallel access channels, such as DDR4.

Thus, serial access channels can result in a greater total bandwidth for a given number of I/O pins than the bandwidth available using parallel access channels for the same number of I/O pins. For example, as illustrated in Table 1 below, a single channel of PCIe 4.0 can achieve a significantly higher total bandwidth (measured in giga-transactions per second) with far fewer pins than a single channel of DDR4-2400.

TABLE 1

| Technology | Configuration | Bandwidth (GT/s) | Pin Count |
| --- | --- | --- | --- |
| DDR4-2400 | 1 Channel - 64 Bit | 19.2 (RX + TX) | 163 |
| PCIe 4.0 | 1 Channel - 8 Bit | 31.5 (RX + TX) | 34 |

However, because the DDR4 latency (approximately 5-20 nanoseconds) is so much smaller than the latency of PCIe 4.0 (approximately 5-20 microseconds), serial access channels such as PCIe are not typically used for memory accesses by a processor (or SoC) in a PCD. The system and methods of the present disclosure replace one or more parallel access channels with one or more serial access channels to create a hybrid parallel-serial memory access. The system and methods provide more overall memory access bandwidth at a lower I/O pin count, with less complexity in signal integrity, and at a lower manufacturing cost than is possible with typical parallel memory access channels, while avoiding the greater latency of typical serial access channels.

Figure 1:
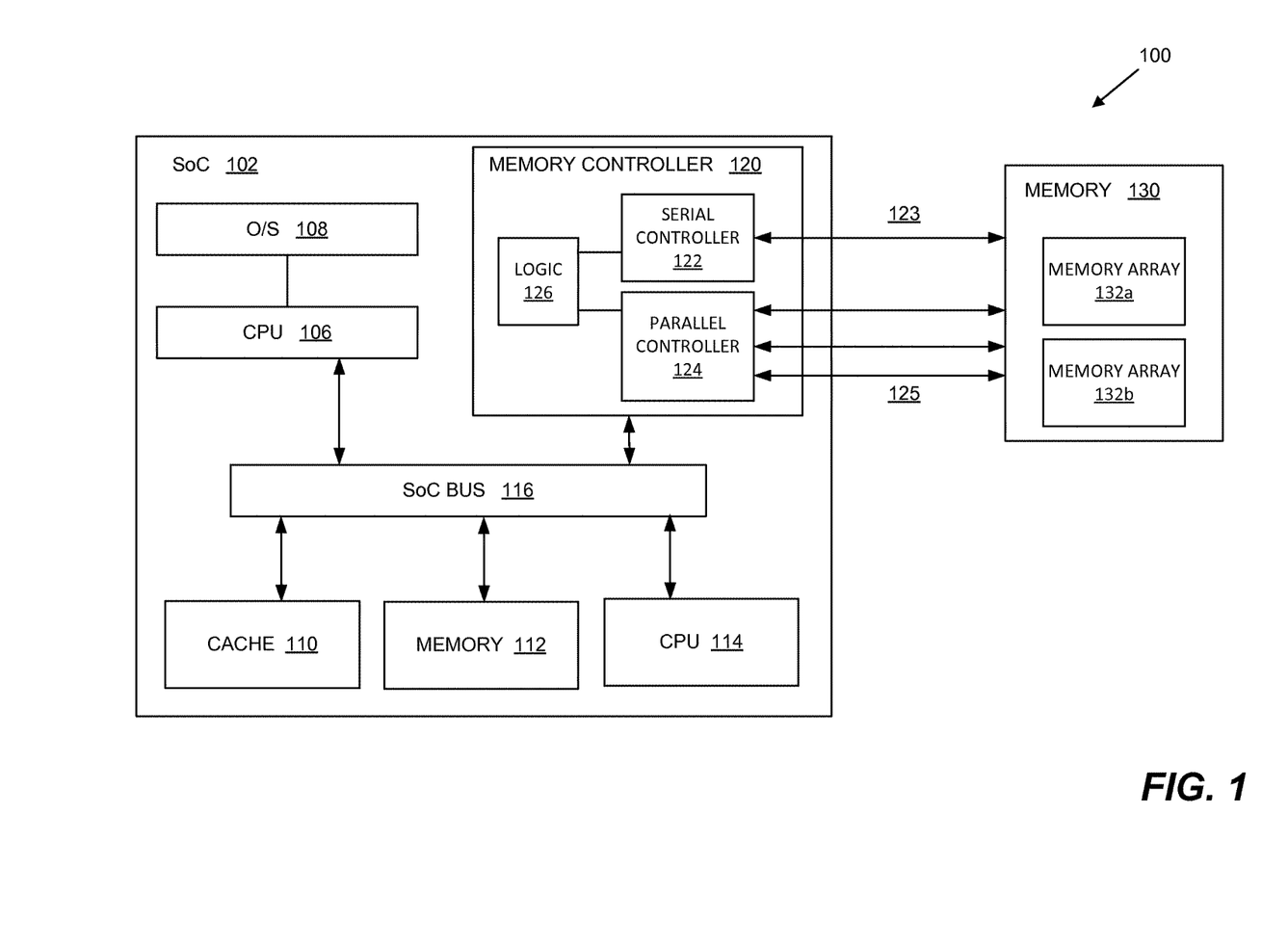
FIG. 1 is a block diagram of an embodiment of a system for a hybrid parallel-serial memory access in an exemplary portable communication device.

FIG. 1 illustrates an embodiment of a system 100 for a hybrid parallel-serial memory access for a system on chip (SoC) 102. The system 100 may be implemented in any computing device, including a personal computer, a workstation, a server, a portable computing device (PCD), such as a cellular telephone, a portable digital assistant (PDA), a portable game console, a tablet computer, or a wearable computer.

As illustrated in the embodiment of FIG. 1, the system 100 comprises a system on chip (SoC) 102 electrically coupled to an external or "off chip" memory 130. The SoC 102 comprises various on-chip components, including a central processing unit (CPU) 106, a memory controller 120, a cache 110 memory, a system memory 112, and an additional CPU 114 all interconnected via a SoC bus 116. The CPU 106 may be controlled by or execute an operating system (OS) 108 that causes the CPU 106 to operate or execute various applications, programs, or code stored in one or more memory of the PCD.

The cache 110 memory of FIG. 1 may be an L2, L3, or other desired cache. Additionally the cache 110 may be dedicated to one processor, such as CPU 106, or may be shared among multiple processors in various embodiments, such as the CPU 106 and CPU 114 illustrated in FIG. 1. In some embodiments the CPU 106 and CPU 114 may be the same type of processor, while in other embodiments the CPU 114 may be a digital signal processor (DSP), a graphics processing unit (GPU), an analog processor, or other type of processor different from CPU 106 executing the OS 108.

System memory 112 may be a static random access memory (SRAM), a read only memory (ROM) 112, or any other desired memory type, including a removable memory such as an SD card. The SoC 102 may include one or more memory clients that request memory resources from memory 130 located external to the SoC 102 or "off chip." The memory clients may comprise one or more processing units (e.g., CPU 106, a GPU, a DSP, etc.), a video encoder, or other clients/components of the SoC 102 requesting read/write access to one or more memory of the PCD.

The SoC 102 further includes a memory controller 120 electrically connected to the SoC bus 116 and also connected to the memory 130 by a serial access channel 123 and a parallel access channel 125 comprising multiple parallel "lanes" as illustrated in FIG. 1. Memory controller 120 manages the data read from and/or stored to the various memories accessed by the SoC 102 during operation of the PCD, including memory 130 illustrated in FIG. 1. In the illustrated embodiment of FIG. 1, the memory controller 120 may further comprises a serial controller 122 to control the data transfer over one or more serial channels 123 and a parallel controller 124 to control the data transfer over one or more lanes of the parallel channel 125. The illustrated embodiment of the memory controller 120 also includes logic 126, which may implement or control part or all of the hybrid parallel-serial memory access as described below.

In various embodiments, one or more of the components of the memory controller 120 illustrated in FIG. 1 may not be part of the memory controller 120, but may instead by part of (or the functionality performed by) other components of the SoC 102. Additionally, in various implementations, some or all of the components of the memory controller 120 may be implemented in hardware, software, or firmware as desired.

The memory 130 interfaces with the SoC via a high-performance memory bus comprising one or more serial access channel(s) 123 and parallel access channels 125. The memory 130 may comprise any volatile or non-volatile memory, such as, for example, synchronous dynamic random access memory (SDRAM), flash memory, flash drive, a Secure Digital (SD) card, a solid-state drive (SSD), or other types. Additionally, as further illustrated in FIG. 1, memory 130 may comprise one or more memory arrays 132a, 132b arranged within the memory 130 to store data. These memory arrays 132a, 132b may be arranged in ranks in some embodiments as would be known in the art.

As discussed above, due to the large quantity of pins to support the parallel access channel 125, the sensitive radio frequency circuits in close proximity to the SoC 102, and the limited distance that the parallel access channel 125 can travel without causing interference, it may difficult and costly to increase the bandwidth of the memory bus to the memory 130 by adding additional or larger lanes to the parallel access channel 125. Instead, increased bandwidth between SoC 102 and memory 130 (or any other system memory such as memory 112) may be achieved with the same number (or fewer) I/O pins through the use of serial access channel(s) 123 that are used in conjunction with the parallel access channel 125 as discussed below to implement the hybrid parallel-serial access to memory 103.

The serial access channel 123 is illustrated in FIG. 1 as a single serial channel 123, but may in other embodiments comprise more than one serial access channel 123. In some implementations, one or more of the serial access channel(s) 123 may be any serial channel and may comprise a direct memory access channel, such as, for example, a PCIe channel. The parallel access channel 125 may also comprise any desired parallel access technology or method, such as a DDR standard like DDR4.

In operation, the system 100 selectively determines whether an access by SoC 102 to memory 130 will be performed over the parallel access channel 125 or over a combination of the parallel access channel 125 and one or more serial access channel 123 as discussed below. In an embodiment, the logic 126 of the memory controller 120 performs such selective determination and the memory access over the parallel access channel 125 and serial access channel 123 are controlled by the parallel controller 124 and serial controller 122 respectively. In other embodiments the serial controller 122, parallel controller 124 and/or logic 126 may be combined into fewer (or different components) and/or arranged differently than thee illustrated configuration of FIG. 1.

Figure 2:
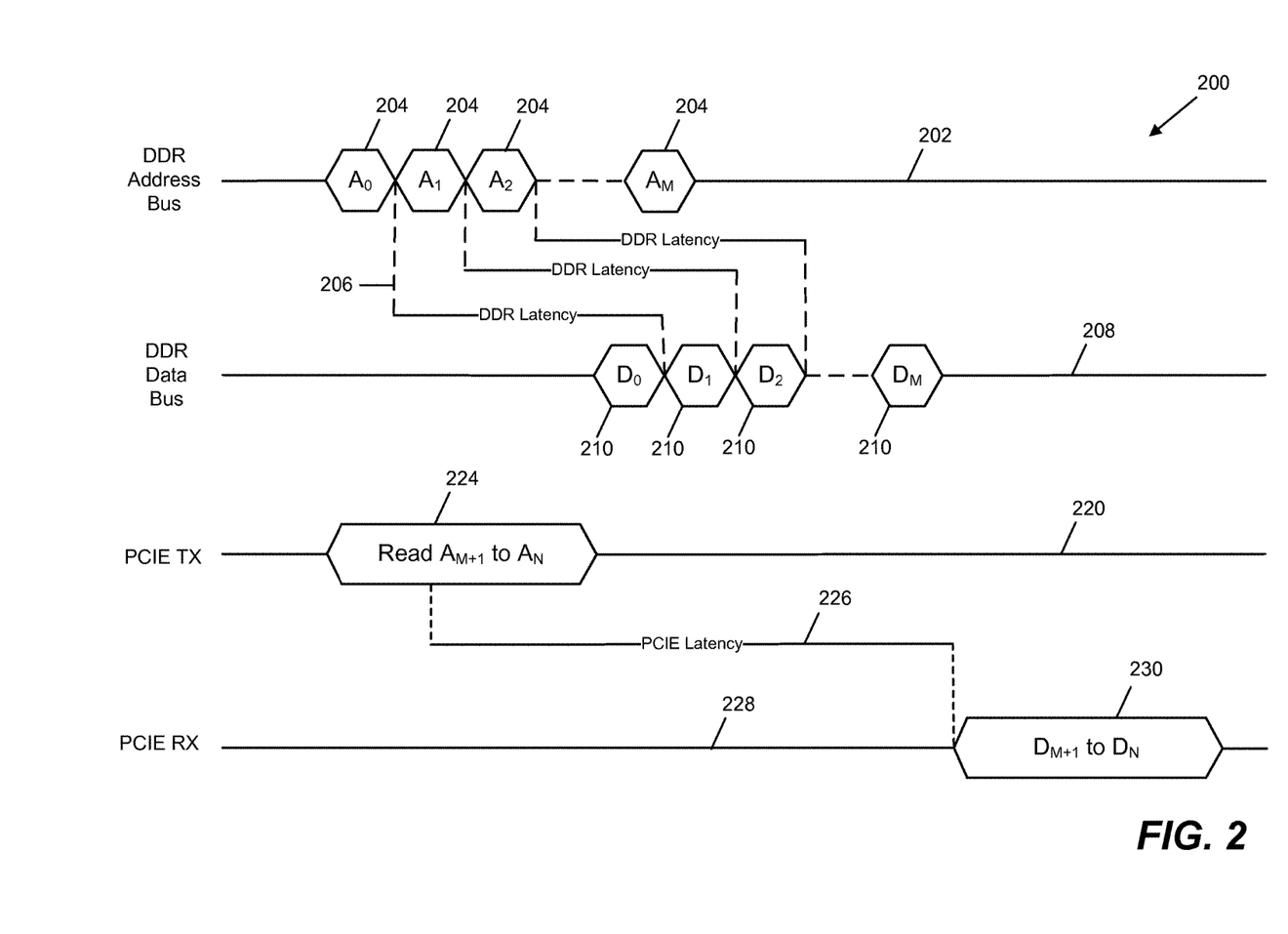
FIG. 2 is a timing diagram of an exemplary operation of a hybrid parallel-serial memory access.

FIG. 2 illustrates a timing diagram of an exemplary operation of a hybrid parallel-serial memory access 200, such as by the system 100 of FIG. 1. In FIG. 2, a request has been made for data in memory addresses $A_0$ through $A_N$ where $A_0$ is the first address of the memory access and $A_N$ is the last address of the memory access and N is an integer greater than 1. As illustrated in FIG. 2, when the memory access request is received, such as at memory controller 120 of SoC 102 in FIG. 1, memory addresses $A_0$-$A_M$ 204 of the memory are accessed through the address bus 202 of a parallel access channel comprised of multiple lanes. The parallel access channel may be any desired parallel channel, such as parallel access channel 125 of FIG. 1. In the illustration of FIG. 2, the parallel access channel is a DDR channel. The data $D_0$-$D_M$ 210 for these memory addresses $A_0$-$A_M$ are then transferred to or received from the memory over the data bus 208 of the parallel access channel, depending on the type of memory access. As illustrated in FIG. 2, there is a latency 206 associated with the transfer of the data $D_0$-$D_M$ 210.

At the same time as the above access through the parallel access channel occurs, the memory addresses $A_{M+1}$-$A_N$ 224 are also accessed 220 over a serial access channel such as serial access channel 123 of FIG. 1. In the illustration of FIG. 2, the serial access channel is a PCIe channel. The data $D_{M+1}$-$D_N$ 230 for these memory addresses $A_{M+1}$-$A_N$ 224 are then transferred 228 either to or from the memory over the serial access channel, depending on the type of memory access. As illustrated in FIG. 2, there is a latency 226 associated with the transfer of the data $D_{M+1}$-$D_N$ 230. Although not shown to scale in FIG. 2, the latency 226 associated with the serial access channel may be many times (even 1000 times) the latency 206 associated with the parallel access channel.

The value of "M" for the memory addresses $A_0$-$A_M$ 204 transferred over the parallel access channel, and the memory addresses $A_{M+1}$-$A_N$ 224 transferred over the serial access channel, is chosen such that the parallel access channel transfers the data $D_0$-$D_M$ 210 during the latency 226 period of the serial access channel. In other words, for a data "block" in memory addresses $A_0$-$A_N$, the serial access channel does not attempt to access the entire data "block," but only accesses the addresses $A_{M+1}$-$A_N$ 224 for a second portion of the data "block." During the latency period 226 it takes the serial access channel to read/write the data $D_{M+1}$-$D_N$ 230 from the addresses $A_{M+1}$-$A_N$ 224, the parallel access channel accesses addresses $A_0$-$A_M$ 204 for a first portion of the data "block" ad begins transferring the data $D_0$-$D_M$ 210 in those addresses.

As will be understood, the value of "M" can vary from system to system and may be determined by the physical characteristics and performance of the parallel access channel and serial access channel, such as for example the latency of the serial access channel and the frequency or operational speed of the parallel access channel. The value of "M" may also depend on the architecture of the PCD, the architecture of the SoC 102, the CPU 106 in the SoC 102 accessing the memory 130, and/or the type of memory 130 being accessed. Additionally, it will be understood that the value of "M" may not be fixed for a particular system, but may vary if for instance the latency of a serial access channel varies during operation and/or if the frequency of the parallel access channel varies (such as for example if a frequency is reduced or increased by entry into or exit from a power saving mode).

Returning to FIG. 2, once the serial access channel has begun to transfer the data $D_{M+1}$-$D_N$ 230 for the data "block," link between the SoC and the memory through the parallel access channel is dropped or terminated and the parallel access channel is freed to perform other tasks/memory accesses. In this manner, a system, such as system 100 of FIG. 1 may take advantage of the higher bandwidth (and smaller footprint, lesser cost, and fewer I/O pins) of the serial access channel 123, without the disadvantage of the high latency of such serial access channel 123. Additionally, it will be appreciated that for certain memories, like memory 130, with separate memory arrays 132a, 132b arranged in ranks such as a dual-in-line memory module (DIMM), the system 100 of FIG. 1 may allow for the parallel access channel, such as a DDR channel, to communicate with a first rank/memory array 132a of the memory 130 and the serial access channel, such as a PCIe channel, to communicate with a second rank/memory array 132b of the memory 130 to further reduce the I/O pin count.

Figure 3:
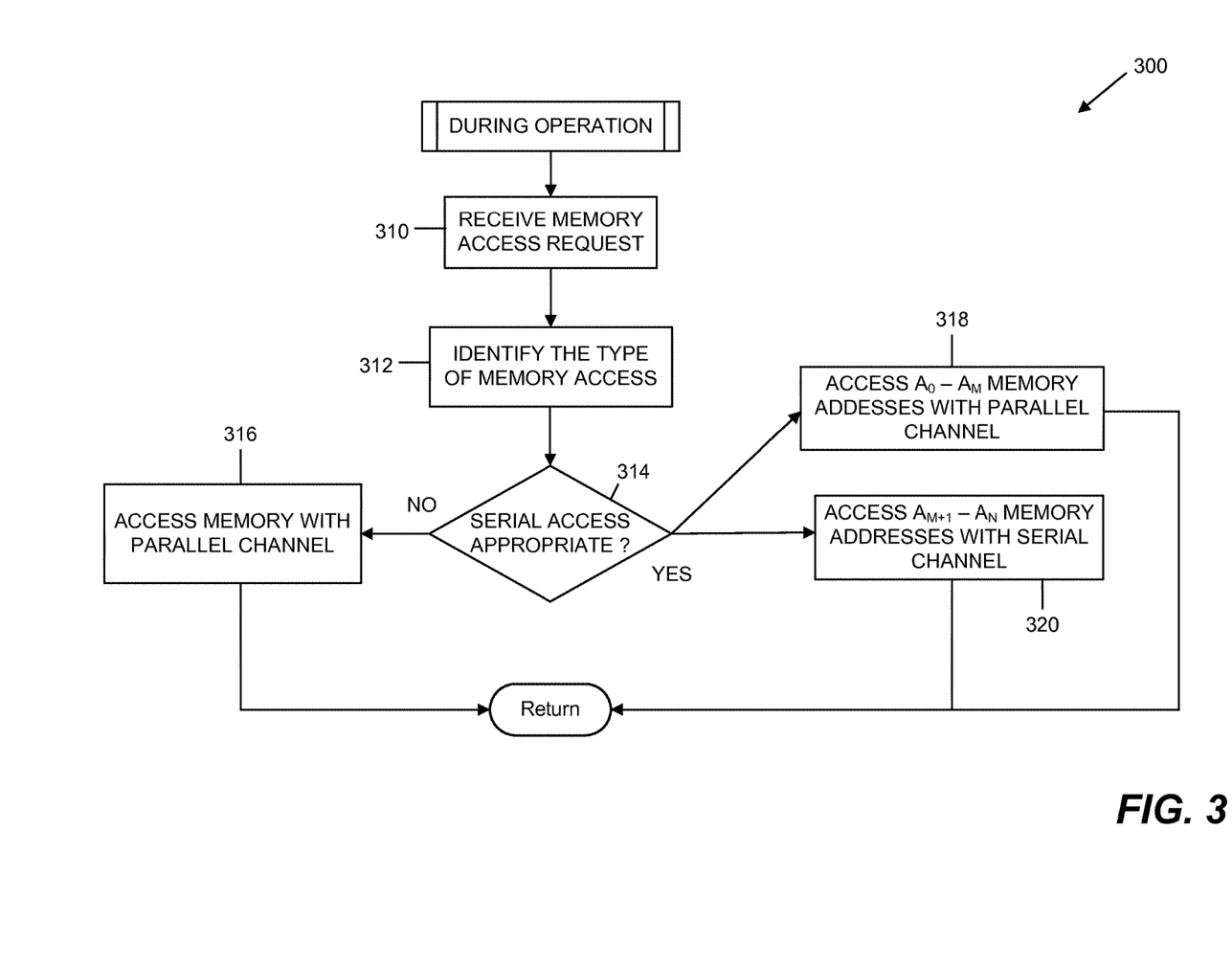
FIG. 3 is a flowchart illustrating an embodiment of a method for hybrid parallel-serial memory access.

FIG. 3 is a flowchart illustrating an embodiment of a method 300 for hybrid parallel-serial memory access. The method 300 of FIG. 3 may operate in accordance with the timing diagram illustrated in FIG. 2 and may be performed by a system 100 like that illustrated in FIG. 1. As illustrated in the embodiment of FIG. 3, during operation of the PCD a memory access request is received in block 310. The access request may be to a memory such as memory 130 that is "off chip" from the SoC 102. The request in block 310 may be received at a controller such as memory controller 120 of the SoC 102 of FIG. 1. Moreover, the request in block 310 may be received from the CPU 106 or from another component of the SoC 102, such as a direct memory access (DMA) by a component of the SoC 102 made independently from CPU 106 or CPU 114.

In block 312 the "type" of memory access is identified. In some embodiments, the identification in block 312 may be whether a small or large data size is being accessed in a memory and/or whether the access is to distributed addresses of the memory or to a "block" of addresses. In some embodiments, the identification in block 312 may instead, or also, be an identification that the access request is from a processor (such as CPU 106 or CPU 114 of FIG. 1), from a GPU, or is a DMA request from another component of an SoC such as a video encoder for example. In yet other embodiments, the identification in block 312 may instead, or also, be an identification of a destination on the SoC 102 for a write request, such as a cache 110 to which an application operating on the SoC 102 may be fetching or pre-fetching data from the "off chip" memory 130.

The identification of block 312 may be made separately from the receipt of the memory access request in block 310 as shown in the embodiment illustrated in FIG. 3. For example, in an embodiment a memory controller such as memory controller 120 of SoC 102 of FIG. 1 may receive the request in block 310. A component of the memory controller 120, such as logic 126 may then identify the type of memory access in block 312. In other embodiments, another component of the SoC 102 may perform the identification of block 312 and/or the identification of block 312 may be made prior to receipt of the access request in block 310. For example, in some embodiments the identification of block 312 may be made previously (such as by a compiler at compile time or during the operation of an operating system such as OS 108 of FIG. 1) and communicated along with memory access request received in block 310.

Continuing with the exemplary method 300, a determination is made in block 314 whether serial access is appropriate for the memory access identified in block 312. In an embodiment, small sized data accesses or data accesses of a random nature (e.g., reads or writes to varying or distributed addresses rather than blocks of addresses) may be determined inappropriate for serial access, while larger or more "bursty" accesses to data "blocks" may be determined appropriate for serial access. For example, in an embodiment, memory accesses of a larger data "block" may be determined in block 314 as appropriate for serial access, where a larger data block may be a number of data addresses and/or amount of data. In some embodiments, a data block may be determined appropriate for serial access in block 314 if a number of data addresses or an amount of data is larger than a pre-determined threshold. In such embodiments, the threshold may be a ratio of a frequency of the parallel access channel to the latency of the serial access channel, or a measure of an amount of data the parallel access channel can transfer during the latency of the serial access channel. In some implementations such ratio against which the data block is compared may be a pre-set value, or may be a value that is determined as part of block 312 or block 314 based on the current operating conditions of the parallel access channel and/or serial access channel.

In some embodiments, the determination in block 314 may be made or made in part, based on the source of the memory access request of block 310. For example, it may be determined in block 314 that DMA accesses, where the range of addresses is typically known, may be appropriate for serial access. Additionally, data accesses from or for a GPU or a video encoder, which typically require access to large amounts of data or large areas of memory, may be determined appropriate for serial access in block 314. Similarly, the determination in block 314 may include consideration of the destination of the data transmission, such as for example a write request to a cache 110 of the SoC 102 as part of a fetch or pre-fetch of data from an "off chip" memory 130.

Additionally, in some embodiments, the determination in block 314 may include considerations of an operating state of the SoC 102 and/or the PCD in which the PCD is operating, For example, in an embodiment the determination in block 314 may be made entirely, or in part, based on power constraints on the SoC 102, CPU 106 and/or the memory 130. In such embodiments, the power constraint on one or more of the SoC 102, CPU 106 and/or the memory 130 may cause the method 300 to determine in block 314 to use whichever of the parallel access channels 123 or serial access channel 125 will consume the least amount of power. As will be understood the considerations of an operating state for the SoC 102 and/or the PCD could include for example, a quality of service (QoS) level, a low power state imposed one or more component of the SoC 102 and/or PCD, a thermal management policy, a desired performance level, etc., or a combination of these.

The determination of block 314 may in some embodiments be made by the same component that received the memory access request of block 310, such as the memory controller 120. In such embodiments the memory controller 120 or a component of the memory controller 120, such as by logic 126, may make the determination based on some or all of the considerations discussed above. In other embodiments, the determination of block 314 may be made elsewhere, such as by a runtime system, an operating system (like OS 108 of FIG. 1), a compiler, a programmer through code instructions that mark large data transfers, etc. For such embodiments where the determination of block 314 is made elsewhere, the determination may be communicated to the component of the SoC 102 that performs or controls the memory access, such as memory controller 120.

If the determination in block 314 (whether made by the memory controller 120 or elsewhere) is that serial access is not appropriate, the method 300 continues to block 316 and the memory access is performed by the parallel channel. In the example of FIG. 1, this may comprise the memory controller 120, or a component of the memory controller 120 such as parallel controller 124, causing the appropriate addresses of the memory 130 to be accessed over one or more lanes of the parallel access channel 125. Any desired technology or standard may be used for such parallel access, including DDR4. The method 300 then returns.

If the determination in block 314 (whether made by the memory controller 120 or elsewhere) is that serial access is appropriate, the method 300 continues to blocks 318 and 320 where access to memory occurs as discussed above with respect to FIG. 2, with access to addresses $A_0$-$A_M$ through the parallel channel (block 318), and access to memory addresses $A_{M+1}$-$A_N$ through the serial channel (block 320). For blocks 318 and 320 $A_0$ is the first address of the memory access and $A_N$ is the last address of the memory access. Also, as discussed above, for blocks 318 and 320 of the method 300, the value of M for the parallel and serial portions of the memory access is chosen (either previously or as part of method 300) such that the parallel access channel accesses and transfers in block 318 the data $D_0$-$D_M$ 210 (see FIG. 2) associated with the memory addresses $A_0$-$A_N$ during the latency 226 period (see FIG. 2) of the serial access channel.

In other words, for a data "block" in memory addresses $A_0$-$A_N$, the serial access channel accesses a portion of the addresses $A_{M+1}$-$A_N$ (block 320 of method 320) at the same time the parallel access channel accesses the first portion of the addresses $A_0$-$A_M$ (block 318 of method 320). The value of "M" is chosen such that during the latency 226 of the serial access channel accessing the data $D_{M+1}$-$D_N$ 230 from the addresses $A_{M+1}$-$A_N$ 224 (see FIG. 2), the parallel access channel accesses and transfers the date from addresses $A_0$-$A_M$ in order to transfer the requested data more rapidly than the serial access channel could transfer the data by itself. The method 300 then returns.

Note that in some embodiments, the determination of block 314 may be made more than once for a memory access. For example, in the event that no information is known about the memory access, the default in block 314 of some embodiments may be to implement the serial access according to blocks 318 and 320. During the memory access, the method 300 may monitor or re-determine whether the serial access is appropriate, such as when the memory address $A_{M+1}$ is reached, i.e. where the serial memory access is to begin (see block 318-320). If the data at address $A_{M+1}$ is no longer needed (e.g. the memory block requested is smaller than $A_{M+1}$ or the memory access was a random access that did access $A_{M+1}$) then the method 300 may re-determine or re-evaluate in block 314 whether the serial access is needed. If it is determined that the serial access is not needed, or no longer needed for the memory address $A_{M+1}$ or beyond, then the method 300 may terminate, drop, or cancel the serial access to the additional memory addresses.

Figure 4:
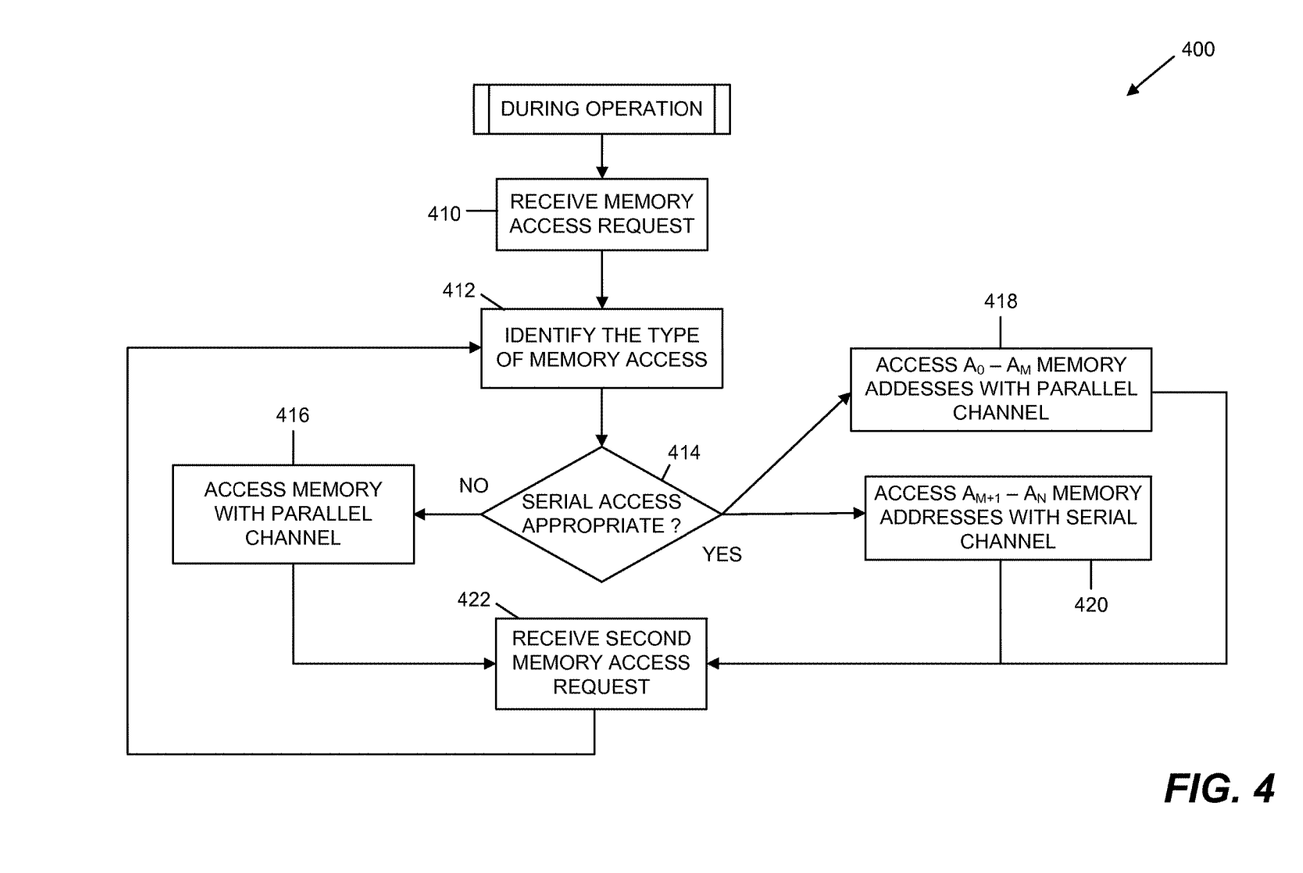
FIG. 4 is a flowchart illustrating another embodiment of a method for hybrid parallel-serial memory access.

Turning to FIG. 4, another embodiment of a method 400 for hybrid parallel-serial memory access is illustrated. The method 400 of FIG. 4 may operate in accordance with the timing diagram illustrated in FIG. 2 and may be performed by a system 100 like that illustrated in FIG. 1. The blocks 410-420 of method 400 are similar to blocks 310-320 of method 300 discussed above, and for the first "iteration" of the method 400, blocks 410-420 may operate in the same manner discussed above for blocks 310-320.

In the embodiment illustrated in FIG. 4, after the memory accesses of blocks 418 and 420 have begun, a second memory access request is received in bloc, 422. As with block 410 (and block 310), the second memory access request may be to the same memory for which the first memory access request was received in block 410, or may be an access request for a different memory. One, or both, of the memories for which access is requested in blocks 410 or 422 may be a memory such as memory 130 of FIG. 1 that is "off chip" from the SoC 102. The request in block 422 may be received at a controller such as memory controller 120 of the SoC 102 of FIG. 1. Moreover, the request in block 422 may be received from the CPU 106 or from another component of the SoC 102, such as a direct memory access (DMA) by a component of the SoC 102 made independently from CPU 106 or CPU 114.

After receipt of the send memory access request of block 422, the method 400 returns to block 412 where the type of the second memory access is identified. As will be understood, the identification of the type of memory access in block 412 may be made in the same manner, by the same components, and taking into account the same considerations discussed above for block 312 of method 300.

Returning to method 400, a determination is made for the second memory access request in block 414 whether serial access is appropriate. As will again be understood, the determination in block 414 may be made in the same manner, by the same components, and taking into account the same considerations discussed above for block 314 of method 300. However, for this second "iteration" after the receipt of the second memory access request in block 422, the determination of block 414 may also take into account or determine whether or not to terminate the serial access of block 420 for the first memory access request of block 410 in order to provide serial access for the second memory access request of block 422.

For example, in some embodiments, the determination of block 414 may be based in part on a comparison of the size or amount of data in the first memory access request to the size or amount of data in the second memory access request. Similarly, in some embodiments, the determination of block 414 may be based in part on any benefit or detriment from terminating the serial access of the first memory access request and instead processing the second memory access request with the serial channel, such as for example whether the serial access of the first request has begun (e.g. whether the latency for the serial channel for the first request has ended) or how much of the serial access of the first request has completed. Once the determination is made in block 414 the method either accesses the memory with the parallel channel alone (block 416) or with the parallel and serial channels at the same time (blocks 418-420), in a similar manner to blocks 316-320 discussed above for method 300.

Figure 5:
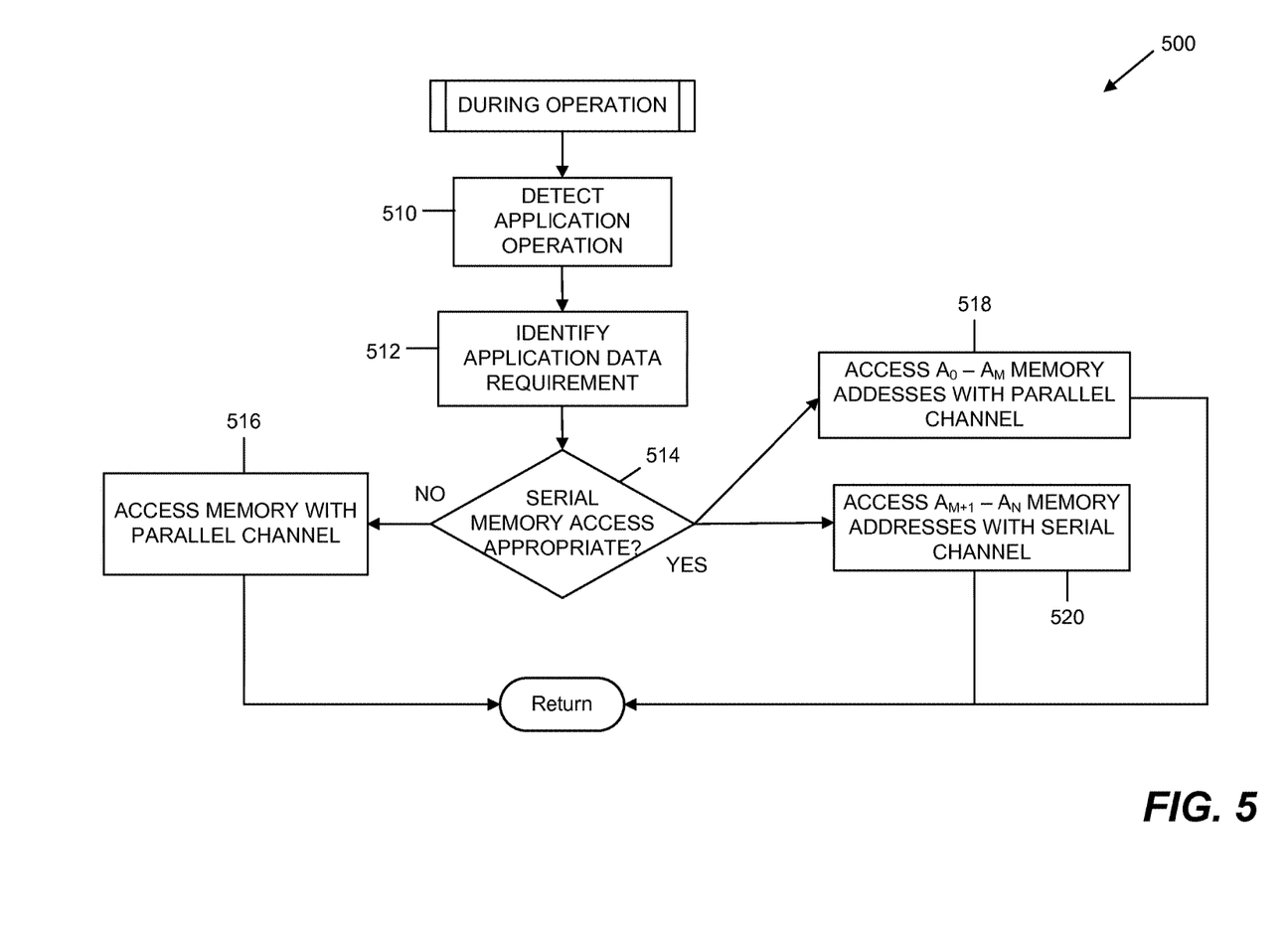
FIG. 5 is a flowchart illustrating other aspects of a method for hybrid parallel-serial memory access.

FIG. 5 is a flowchart illustrating other aspects of a method 500 for hybrid parallel-serial memory access. The method 500 of FIG. 5 may operate in accordance with the timing diagram illustrated in FIG. 2 and may be performed by a system 100 like that illustrated in FIG. 1. The blocks 510-520 of method 500 are similar to blocks 310-320 of method 300 discussed above, with the addition that method 500 may also, or instead, may start from the detection of the operation of an application in block 510, such as an operation of an application, task, function, code, etc., by the CPU 106 or by another component of the SoC 102 in the system 100 of FIG. 1.

The detection of the operation of an application in block 510 may include the detection/receipt of a memory access request as discussed above for block 310 of method 300. Additionally, the detection of the operation of an application in block 510 may also include detection, such as by the OS 108 in FIG. 1, the operation of certain applications, tasks, code, functionality, component etc., that are understood or known to be "memory intensive" or to other require accesses to the memory 130. The method 500 may then in block 512 identify any data requirements for the application or data requirements for future applications, tasks, or code based on the detection in block 510. Such data requirements may include predictions of future memory accesses and/or the addresses for such memory accesses before any request for memory access (such as to memory 130 of FIG. 1) is generated and/or received.

For example, in an embodiment, based on a detection in block 510 that an application is operating or beginning to operate, the method 500 in block 512 may identify or predict future data requirements for the application (or for another application, task, etc.) based on the current operation of the application. Continuing with the example, after detecting that the application is beginning to operate, the method 500 may in block 512 identify resources or data that may be desirable to load to the SoC 102, such as in a last-level cache 110 or other memory 112 of the SoC 102 illustrated in FIG. 1, before the application sends a request for such data or resources. In that event, the method 500 may identify in block 512 resources or data needed that will be needed by the application to begin fetching or pre-fetching.

Examples of applications or tasks detected in block 510 for which application data requirements may be identified in block 512 include audio and/or video processing such as by a CPU, GPU, DSP, or encoder (for example operating on a streaming type workload); a GPU or CPU rendering graphics textures and/or vertices; wireless signal processing by a CPU or DSP (such as buffering next packets); etc. After identifying application data requirements in block 512, the method 500 determines whether to access the needed data or resources with a serial access channel in block 514, similar to the discussion above with respect to block 314 of method 300. As a result of the determination in block 514, the method 500 either accesses the memory with the data using only the parallel channel alone (block 516) or with the parallel and serial channels at the same time (blocks 518-520), in a similar manner to blocks 316-320 discussed above for method 300.

Note that in some embodiments, one or more of steps 510 and 512 may also be performed as part of method 300, instead of as the stand-alone method illustrated in FIG. 5. For example, either after or as part of receiving a memory access request in block 310 of method 300, the method 300 may also detect whether an application is operating (block 510 of method 500) in the manner discussed above. That is, in some embodiments, method 300 may implement predictive features like those discussed for the method 500 of FIG. 5 into the method 300 of FIG. 3, either as separate additional steps/blocks, or as part of the already illustrated steps/blocks of FIG. 3.

Figure 6:
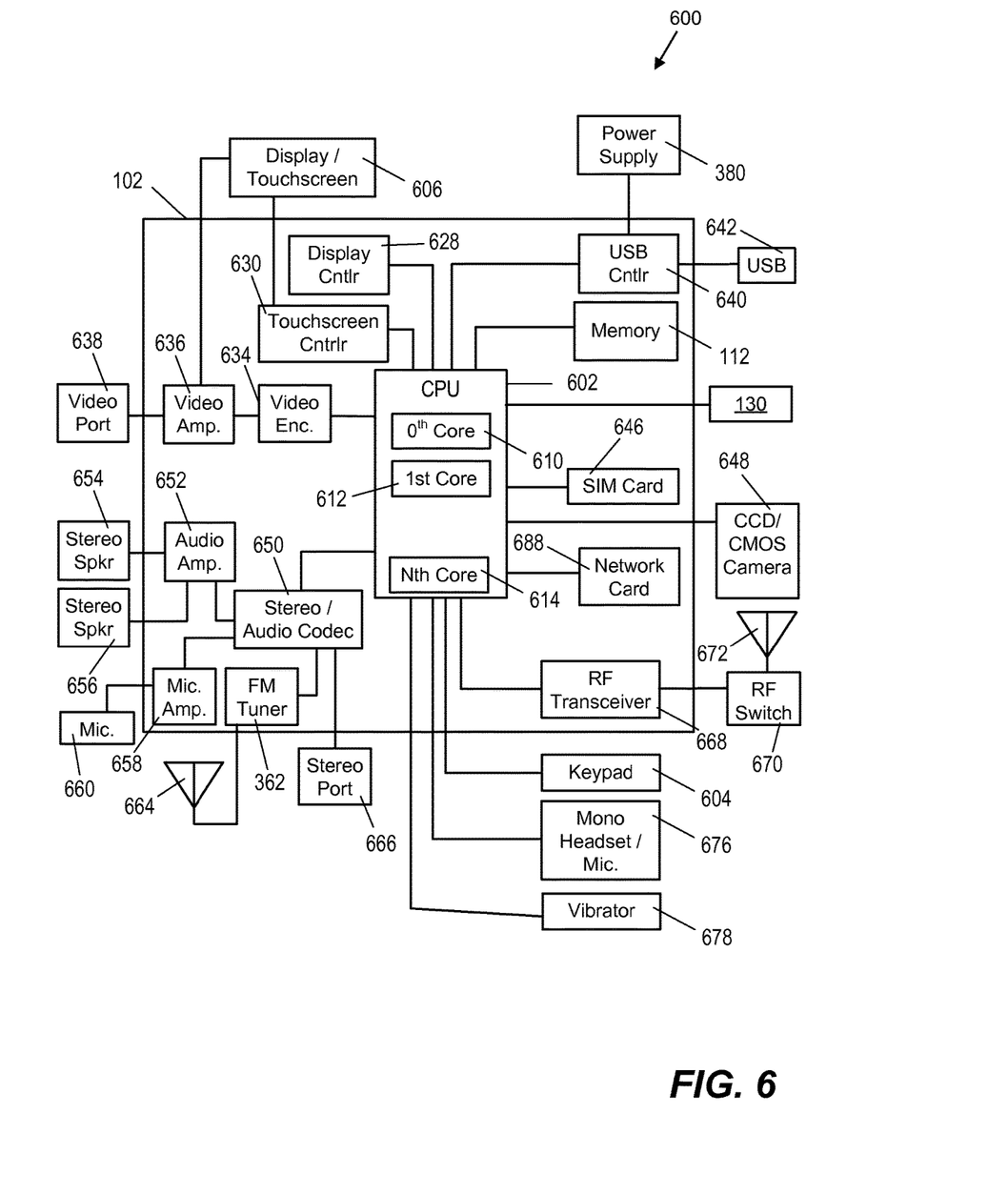
FIG. 6 is a block diagram of an exemplary portable communication device (PCD) in which the system of FIG. 1 or method of FIGS. 3-5 may be implemented.

As mentioned above, the system 100 of FIG. 1 and methods 300 (FIG. 3), 400 (FIG. 4) and/or 500 (FIG. 5) may be incorporated into or performed by any desirable computing system. FIG. 6 illustrates the system 100 incorporated in an exemplary portable computing device (PCD) 600. In this embodiment, the SoC 102 may include a multicore CPU 602. The multicore CPU 602 may include a zeroth core 610, a first core 612, and an Nth core 614. One of the cores may comprise, for example, a graphics processing unit (GPU) with one or more of the others comprising the CPU.

A display controller 628 and a touch screen controller 630 may be coupled to the CPU 602. In turn, the touch screen display 606 external to the on-chip system 102 may be coupled to the display controller 628 and the touch screen controller 630.

FIG. 6 further shows that a video encoder 634, e.g., a phase alternating line (PAL) encoder, a sequential color a memoire (SECAM) encoder, or a national television system(s) committee (NTSC) encoder, is coupled to the multicore CPU 602. Further, a video amplifier 636 is coupled to the video encoder 334 and the touch screen display 606. Also, a video port 638 is coupled to the video amplifier 636. As shown in FIG. 6, a universal serial bus (USB) controller 640 is coupled to the multicore CPU 602. Also, a USB port 642 is coupled to the USB controller 340. Memory 112 and a subscriber identity module (SIM) card 646 may also be coupled to the multicore CPU 602.

Further, as shown in FIG. 6, a digital camera 648 may be coupled to the multicore CPU 602. In an exemplary aspect, the digital camera 648 is a charge-coupled device (CCD) camera or a complementary metal-oxide semiconductor (CMOS) camera.

As further illustrated in FIG. 6, a stereo audio coder-decoder (CODEC) 650 may be coupled to the multicore CPU 602. Moreover, an audio amplifier 652 may be coupled to the stereo audio CODEC 650. In an exemplary aspect, a first stereo speaker 654 and a second stereo speaker 656 are coupled to the audio amplifier 652. FIG. 6 shows that a microphone amplifier 658 may be also coupled to the stereo audio CODEC 650. Additionally, a microphone 660 may be coupled to the microphone amplifier 658. In a particular aspect, a frequency modulation (FM) radio tuner 662 may be coupled to the stereo audio CODEC 650. Also, an FM antenna 664 is coupled to the FM radio tuner 662. Further, stereo headphones 666 may be coupled to the stereo audio CODEC 650.

FIG. 6 further illustrates that a radio frequency (RF) transceiver 668 may be coupled to the multicore CPU 602. An RF switch 670 may be coupled to the RF transceiver 668 and an RF antenna 672. A keypad 604 may be coupled to the multicore CPU 602. Also, a mono headset with a microphone 676 may be coupled to the multicore CPU 602. Further, a vibrator device 678 may be coupled to the multicore CPU 602.

FIG. 6 also shows that a power supply 680 may be coupled to the on-chip system 102. In a particular aspect, the power supply 680 is a direct current (DC) power supply that provides power to the various components of the PCD 600 that require power. Further, in a particular aspect, the power supply is a rechargeable DC battery or a DC power supply that is derived from an alternating current (AC) to DC transformer that is connected to an AC power source.

FIG. 6 further indicates that the PCD 600 may also include a network card 688 that may be used to access a data network, e.g., a local area network, a personal area network, or any other network. The network card 688 may be a Bluetooth network card, a WiFi network card, a personal area network (PAN) card, a personal area network ultra-low-power technology (PeANUT) network card, a television/cable/satellite tuner, or any other network card well known in the art. Further, the network card 688 may be incorporated into a chip, i.e., the network card 688 may be a full solution in a chip, and may not be a separate network card 688.

Referring to FIG. 6, it should be appreciated that the memory 130, touch screen display 606, the video port 638, the USB port 642, the camera 648, the first stereo speaker 654, the second stereo speaker 656, the microphone 660, the FM antenna 664, the stereo headphones 666, the RF switch 670, the RF antenna 672, the keypad 674, the mono headset 676, the vibrator 678, and the power supply 680 may be external to the on-chip system 102 or "off chip."

It should be appreciated that one or more of the method steps described herein may be stored in the memory as computer program instructions. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for accessing a memory, the method comprising:
   receiving a request to access a memory electrically coupled to a system on chip (SoC) by a parallel access channel and electrically coupled to the SoC by a separate serial access channel, the request to access the memory corresponding to a plurality of memory addresses of the memory;
   in response to receiving the request to access the memory, identifying a type of memory access;
   determining based on the identified type of memory access whether to access the memory with the serial access channel; and
   in response to the determination to access the memory with the serial access channel, accessing a first portion of the plurality of memory addresses with the parallel access channel, and accessing a second portion of the plurality of memory addresses with the serial access channel.

2. The method of claim 1, wherein:
   the plurality of memory addresses of the request to access the memory comprises addresses $A_0$-$A_N$ of the memory where N is an integer greater than 1,
   accessing the first portion of the plurality of memory address with the parallel access channel comprises accessing addresses $A_0$-$A_M$ of the memory, and
   accessing the second portion of the plurality of memory addresses with the serial access channel comprises accessing addresses $A_{M+1}$-$A_N$ of the memory, where M is an integer comprising a ratio of a frequency of the parallel access channel to a latency of the serial access channel.

3. The method of claim 1, wherein the memory comprises synchronous dynamic random access memory (SDRAM), the parallel access channel comprises a double data rate (DDR) channel between the SDRAM and the SoC, and the serial access channel comprises a direct memory access channel.

4. The method of claim 3, wherein the direct memory access channel comprises a peripheral component interconnect express (PCIe) channel.

5. The method of claim 3, wherein the DDR channel is electrically coupled to a first memory array of the SDRAM and the serial access channel is electrically coupled to a second memory array of the SDRAM.

6. The method of claim 1, wherein identifying the type of memory access comprises identifying one or more of a size of data stored in the plurality of memory addresses, a distribution of the plurality of memory addresses, a component of the SoC making the request, or a destination on the SoC to receive the data stored in the plurality of memory addresses.

7. The method of claim 6, wherein determining whether to access the memory with the serial access channel comprises determining if the size of the data is greater than an amount of data the parallel access channel can transfer during the latency of the serial access channel.

8. A system for accessing a memory, the system comprising:
means for receiving a request to access a memory electrically coupled to a system on chip (SoC) by a parallel access channel and electrically coupled to the SoC by a separate serial access channel, the request to access the memory corresponding to a plurality of memory addresses of the memory;
means for identifying a type of memory access in response to receiving the request to access the memory;
means for determining based on the identified type of memory access whether to access the memory with the serial access channel; and
means for accessing, in response to the determination to access the memory with the serial access channel, a first portion of the plurality of memory addresses with the parallel access channel, and means for accessing a second portion of the plurality of memory addresses with the serial access channel.

9. The system of claim 8, wherein:
the plurality of memory addresses of the request to access the memory comprises addresses $A_0$-$A_N$ of the memory where N is an integer greater than 1,
the means for accessing the first portion of the plurality of memory address with the parallel access channel comprises accessing addresses $A_0$-$A_M$ of the memory, and
the means for accessing the second portion of the plurality of memory addresses with the serial access channel comprises accessing addresses $A_{M+1}$-$A_N$ of the memory, where M is an integer comprising a ratio of a frequency of the parallel access channel to a latency of the serial access channel.

10. The system of claim 8, wherein the memory comprises synchronous dynamic random access memory (SDRAM), the parallel access channel comprises a double data rate (DDR) channel between the SDRAM and the SoC, and the serial access channel comprises a direct memory access channel.

11. The system of claim 10, wherein the direct memory access channel comprises a peripheral component interconnect express (PCIe) channel.

12. The system of claim 10, wherein the DDR channel is electrically coupled to a first memory array of the SDRAM and the serial access channel is electrically coupled to a second memory array of the SDRAM.

13. The system of claim 8, wherein the means for identifying the type of memory access comprises means for identifying one or more of a size of data stored in the plurality of memory addresses, a distribution of the plurality of memory addresses, a component of the SoC making the request, or a destination on the SoC to receive the data stored in the plurality of memory addresses.

14. The system of claim 13, wherein the means for determining whether to access the memory with the serial access channel comprises means for determining if the size of the data is greater than an amount of data the parallel access channel can transfer during the latency of the serial access channel.

15. A system for accessing a memory, the system comprising:
a system on chip (SoC) electrically coupled to a memory by a parallel access channel and a separate serial access channel,
wherein the SoC comprises a memory controller configured to:
receive a request to access the memory the request corresponding to a plurality of memory addresses of the memory,
in response to receiving the request to access the memory, identify a type of memory access,
determine based on the identified type of memory access whether to access the memory with the serial access channel, and
in response to determining to access the memory with the serial access channel, accessing a first portion of the plurality of memory addresses with the parallel access channel, and accessing a second portion of the plurality of memory addresses with the serial access channel.

16. The system of claim 15, wherein:
the plurality of memory addresses of the request to access the memory comprises addresses $A_0$-$A_N$ of the memory where N is an integer greater than 1,
accessing the first portion of the plurality of memory address with the parallel access channel comprises accessing addresses $A_0$-$A_M$ of the memory, and
accessing the second portion of the plurality of memory addresses with the serial access channel comprises accessing addresses $A_{M+1}$-$A_N$ of the memory, where M is an integer comprising a ratio of a frequency of the parallel access channel to a latency of the serial access channel.

17. The system of claim 15, wherein the memory comprises synchronous dynamic random access memory (SDRAM), the parallel access channel comprises a double data rate (DDR) channel between the SDRAM and the SoC, and the serial access channel comprises a direct memory access channel.

18. The system of claim 17, wherein the direct memory access channel comprises a peripheral component interconnect express (PCIe) channel.

19. The system of claim 17, wherein the DDR channel is electrically coupled to a first memory array of the SDRAM and the serial access channel is electrically coupled to a second memory array of the SDRAM.

20. The system of claim 15, wherein:
identifying the type of memory access comprises identifying one or more of a size of data stored in the plurality of memory addresses, a distribution of the plurality of memory addresses, a component of the SoC making the request, or a destination on the SoC to receive the data stored in the plurality of memory addresses, and
determining whether to access the memory with a serial access channel comprises determining if the size of the data is greater than an amount of data the parallel access channel can transfer during the latency of the serial access channel.

* * * * *